June 21, 1949.  V. N. TRAMONTINI  2,474,129
WELDING APPARATUS
Filed Aug. 14, 1947  2 Sheets-Sheet 1
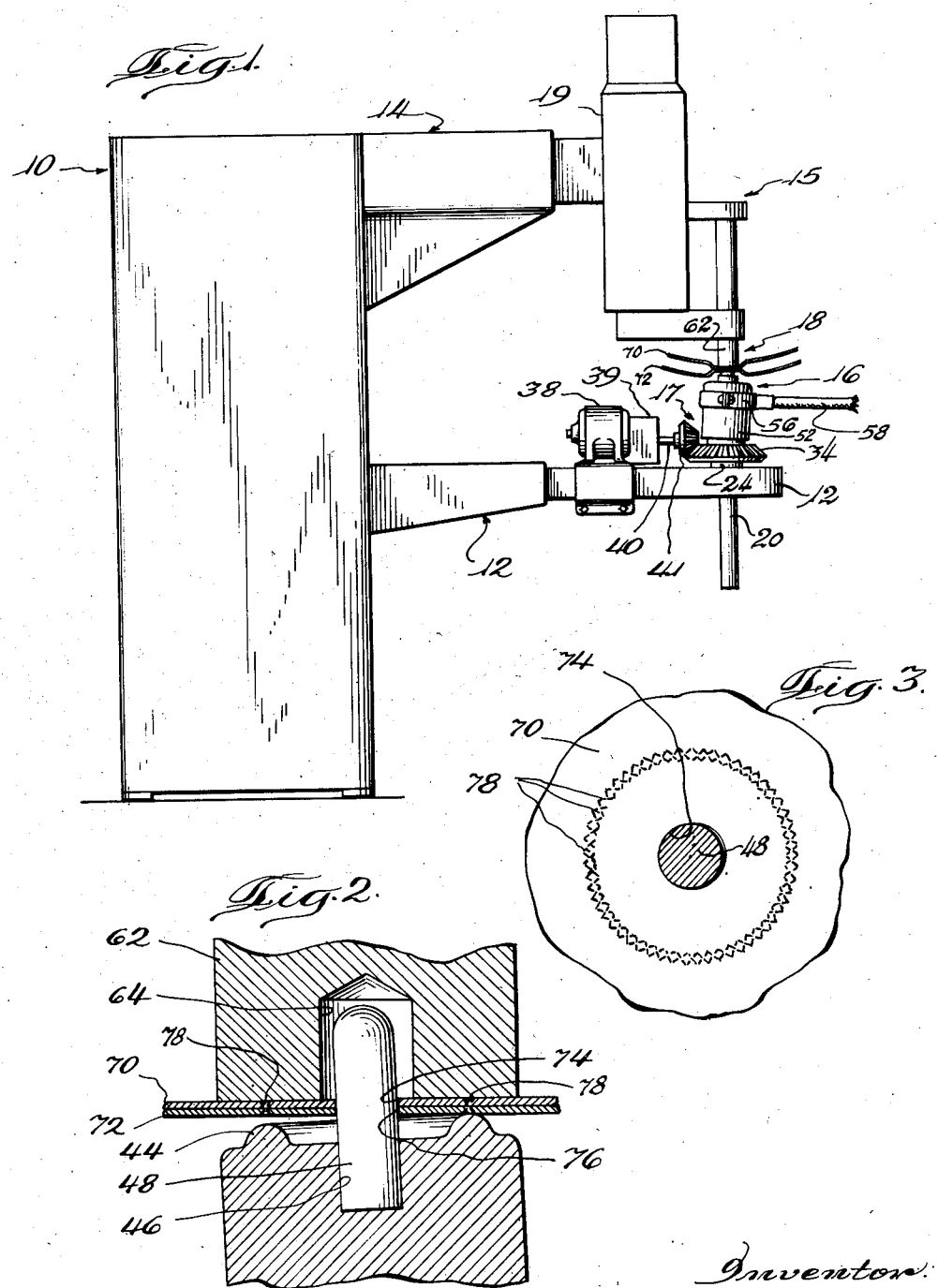
Inventor:
Vernon N. Tramontini
By Hinkle, Horton, Ahlberg, Haussmann & Kipper
attorneys

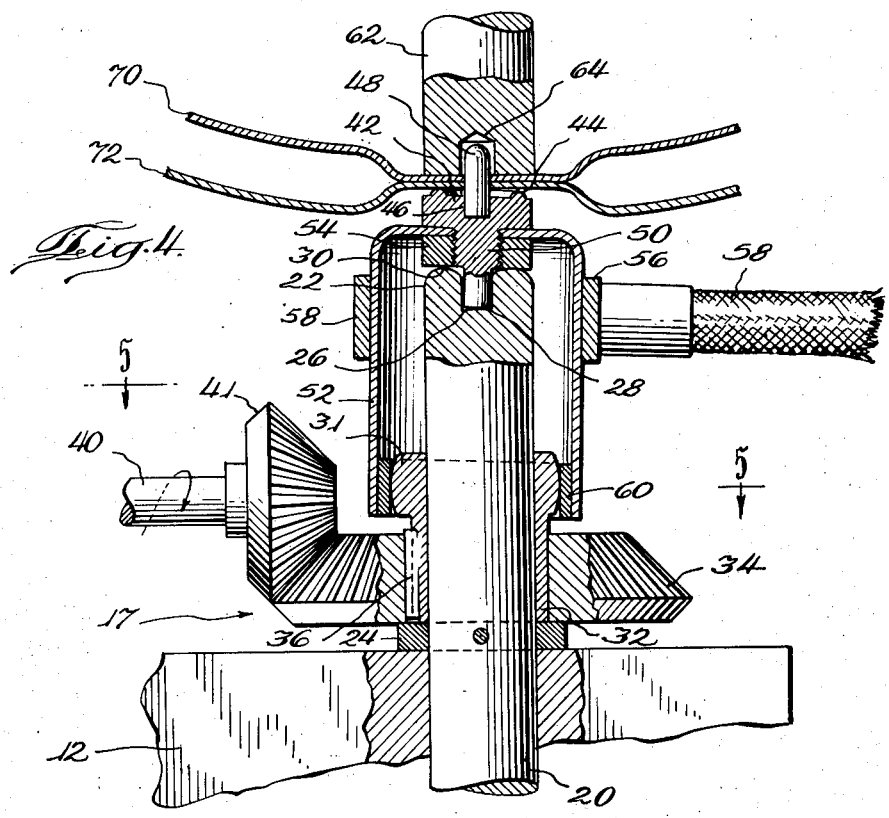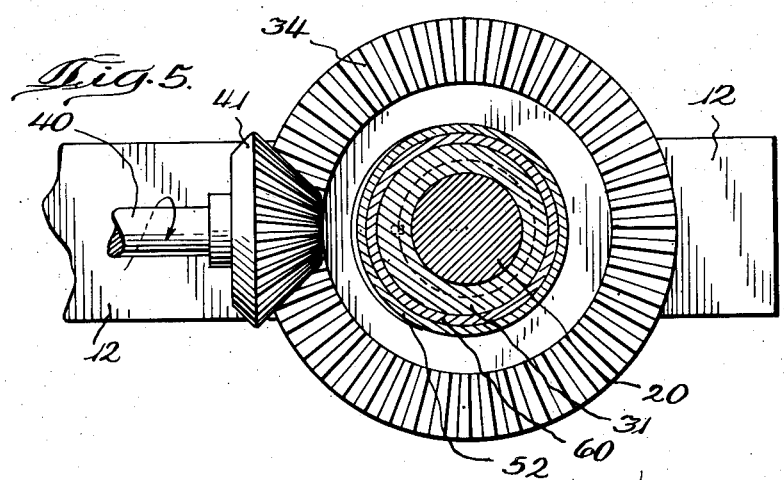

Patented June 21, 1949

2,474,129

UNITED STATES PATENT OFFICE 2,474,129

WELDING APPARATUS

Vernon N. Tramontini, Indianapolis, Ind., assignor to Stewart-Warner Corporation, Chicago, Ill., a corporation of Virginia Application August 14, 1947, Serial No. 768,668

4 Claims. (Cl. 219—4)

My invention pertains to welding machines and more particularly to welding machines whose function it is to make small circular welds.

In the metal working arts it is frequently necessary to provide a communicating passage between two chambers or surfaces of a product. One way of doing this is to punch the sheets forming the adjoining surfaces or walls of the chambers with identical holes, align the holes, and weld the surrounding material together by a circular seam weld. Methods of making such welds, that is, welds between a half inch and six inches in diameter, have been known in the past. However, they are all deficient in one or more aspects. Guiding the workpiece manually between two electrodes meets with the usual difficulty of the inaccuracy of manual direction. Resistance welding by passing the metal between two inclined wheel electrodes has the double disadvantage of, first, manual direction, and, second, limitation on the size of the workpiece by the throat of the welding machine due to the necessity of rotating the work-piece through 360°. Further, there is a minimum practical limit to the diameter of circular seam welds which can be accomplished by this method and this makes the process unsuitable for certain purposes. Annular electrodes clamped flatly against the metal have the disadvantage of a maldistribution of the charge and consequently an uneven weld with the slightest variance of pressure between points on the electrodes or deviations in the thickness of the workpiece.

The object of the present invention is, therefore, to provide an apparatus for making more perfect small circular welds.

Another object is to make such welds more quickly than has hitherto been possible.

Another object is to make such welds without the necessity of rotating the workpiece.

Still another object is to make such welds without the necessity for manual guidance of the workpiece.

Yet another object is to make small circular seam welds by uniformly spaced overlapping spot welds.

Other objects and advantages of my invention will become apparent from the following description of a preferred embodiment of my invention which is illustrated in the accompanying drawings.

In the drawings:

Fig. 1 is a side elevational view of my invention mounted on a welding machine;

Fig. 2 is a vertical cross sectional view of the electrodes of my invention;

Fig. 3 is a top elevational view of a characteristic weld;

Fig. 4 is a vertical cross sectional view of my invention;

Fig. 5 is a horizontal cross sectional view taken along the line 5—5 of Fig. 4.

The principle behind this invention is that by circularly rocking an annular electrode in a resistance welder, the point of current flow or the pressure point of the moving electrode will progress evenly and uniformly about a circle on the workpiece, and if welding shots are regularly and appropriately timed through the electrode, an overlapping and regularly spaced series of spot welds may be obtained to constitute a perfect seam weld. It will be understood that this principle may be equally well employed for making elliptical welds or indeed any welds following a curved line if the means for exerting pressure on the workpiece are sufficiently resilient, as they conventionally are, to compensate for the differences in the height of the pressure point in a non-circular electrode.

The elements forming the apparatus are mounted in a resistance welder 10 having a lower arm 12 and an upper arm 14, and comprise an upper electrode unit 15, a lower electrode unit 16 and a mounting and driving mechanism 17. The upper electrode unit is mounted on the extremity of the upper arm 14 and consists of the upper electrode 18 and the resilient pressure exerting means 19 of conventional construction.

The mounting and driving mechanism 17 includes a stationary cylindrical steel post 20 coaxial with the upper electrode 18 passing vertically through the lower arm 12 and projecting partially above it. The height of the upper end 22 above the lower arm 14 is adjustably fixed by collar 24. The upper end 22 is formed in the shape of a heavy-walled cup to provide a recess 26 for a centering pin 28. The crown 30 of the cup wall is rounded and has a diameter equal to that of the desired weld. An eccentric 31 made of hardened steel is movably mounted on post 20. It has a downwardly extending integral flange 32 formed on it concentric with the post 20 and rotatable around it which rides on collar 24. A horizontal bevel gear 34 is mounted on flange 32 coaxial with the flange and steel post 20 in fixed, non-rotating fashion by key 36. A motor 38 with a reduction gear box 39 is separately mounted on the lower arm 12, and has a second bevel gear 41 mounted on the shaft 40 thereof rotating in a vertical plane and engaging and driving bevel gear 34.

The lower electrode unit 16 comprises a cylindrical copper electrode 42 having a ridge 44 formed on the upper end thereof which serves to define the weld. When the desired weld is circular, as illustrated herein, the ridge will be circular in form with a diameter approximately equal to that of the desired weld and concentric with the axis of the electrode. In the center of this same end a cylindrical cavity 46 is formed adapted to contain rigidly a steel locating pin 48. On the other end of the electrode 42 there is an axial extension 50, threaded on the portion adjacent to the electrode, and smooth-surfaced and of reduced diameter on the portion distant therefrom, the latter part of the extension forming the centering pin 28 which seats in recess 26. The extension 50 is threaded downwardly into an axial opening in the bottom of an inverted copper cup 52 which forms a skirt for the electrode. The electrode is rigidly secured on the cup by a hardened steel lock washer 54 threaded on the extension 50 interiorly of the cup which also serves the purpose of a thrust bearing when the machine is in operation. A copper clamp 56 is affixed to the wall of the cup to which the heavy flexible lead 58 is secured. A hardened steel ring 60 is pressed into the cup adjacent to its edge providing a bearing surface for the eccentric. The cup is placed on the post 20, the centering pin 28 seating in the cavity 26, and the rim bearing the steel ring 60 extending downwardly so that the ring rotatably engages eccentric 31.

The upper electrode 62 is a cylindrical copper member generally equal in diameter to the lower electrode 42 but in any case greater in diameter than the desired weld and having a plane surface for its lower end. A recess 64 is formed axially in the lower end adapted to receive the locating pin 48 and of sufficient size so that as the lower electrode is engaged in its wobbling motion, there will be no danger of arcing between the locating pin and the upper electrode.

In operation, the two sheets 70 and 72 of metal to be welded having the requisite holes 74 and 76 formed in them are placed on the lower electrode with the locating pin passing through the holes to align them. The locating pin should fit the holes as closely as possible, consonant with the wobbling of the lower electrode, in order to effect maximum accuracy in the centering. Since the wobble is very slight, as will be subsequently described, a spindle diameter a few thousandths of an inch smaller than that of the holes is sufficient. The motor may be in continuous motion or restarted for each weld since the wobble again is of sufficiently small degree that there will be no difficulty in dropping the holes over the moving locating pin. The upper electrode is then lowered to clamp the sheets between the two electrodes with the desired pressure.

The rotating shaft 40 drives the bevel gear 34 rotatably about post 20 to make on the order of 24 revolutions per minute. This motion is transferred to the eccentric 30 by virtue of the flange 32 of the eccentric keyed to the gear. The eccentric, bearing against the closely fitting ring 60, moves the base of the cup in a circular fashion. The centering pin 28 provides a pivotal point for the lower electrode intermediate between the eccentric-driven end of the skirt and the welding surface of the elecetrode so that the rotary rocking movement of the skirt is transmitted to the ridge 44. The effect of this motion is to provide a continuously moving point of contact about the outline of the desired weld, each point on the ridge consecutively rising to provide a welding contact and then receding from the metal.

Experience has shown that the optimum degree of wobble, that is, the difference in height between the high and the low side of the ridge at any given instant, in order to secure accurate placing of the shots and at the same time to keep the diameter of the locating pin as close as possible in size to the diameter of the holes, is on the order of .005 inch. I have also found that the torque exerted on the lower electrode is small enough and the conventional electric lead heavy enough so that when the lead 58 is clamped to the electrode it is sufficient to prevent rotation of the latter about its axis. The time interval of the welding shots and the speed of rotation of the electrodes are, of course, variable, depending on the diameter of the desired weld and the desired spacing of the shots 78.

Having thus described my invention, what I claim as new and useful and desire to secure by Letters Patent of the United States is:

1. A welding apparatus for making small diameter circular welds comprising a resistance welding machine, a non-rotating lower electrode mounted on said machine, a circular ridge formed axially on the welding surface thereof equal in diameter to the desired weld, means for pivotally mounting the end of said electrode opposite said welding surface on said machine, a skirt depending axially from said electrode to a point below said mounting point, a bearing surface on said skirt, a rotating eccentric bearing against said bearing surface and imparting an alternate rising and falling motion successively and continuously to each point of said ridge, means for rotating said eccentric, an upper electrode with a plane welding surface, and means for forcing said upper electrode against said lower electrode.

2. A welding apparatus as claimed in claim 1, wherein a heavy electrical lead is secured to said skirt thereby preventing rotation of said lower electrode while also providing a path of low electrical resistance for supplying an electrical current to said electrode.

3. A device for attaching to a resistance welding machine to provide the lower electrode thereof, comprising a non-rotating electrode, a circular ridge formed axially on the welding surface thereof equal in diameter to the desired weld, means for pivotally mounting the end of said electrode opposite said welding surface on the said machine, a skirt depending axially from said electrode to a point below said mounting point, a bearing surface on said skirt, a rotating eccentric bearing against said bearing surface and imparting an alternate rising and falling motion successively and continuously to each point of said ridge and means for rotating said eccentric, said means including a motor and reduction gear box to be separately mounted on said machine.

4. A welding apparatus for making small diameter circular welds comprising a pair of opposed welding electrodes adapted to be forced toward each other to clamp metal to be welded therebetween, one of said electrodes having a circular ridge formed upon the welding face thereof, one of said electrodes being adapted for rigid attachment to a welding machine, a post adapted to be rigidly fixed in a welding machine in alignment with the last said electrode with one end of said post adjacent the welding face of the last said electrode, the other electrode being pivoted for rocking motion at said one end of said post, an actuator connected rigidly to the last said electrode and extending away from the welding surface thereof, rotatable eccentric means coacting with said actuator to give the last said electrode a circularly rocking motion, and means for rotating said eccentric means.

VERNON N. TRAMONTINI.

REFERENCES CITED

The following references are of record in the file of this patent:

UNITED STATES PATENTS

| Number | Name | Date |
| --- | --- | --- |
| 1,196,852 | Fulda | Sept. 5, 1916 |
| 2,006,458 | Jones et al. | July 2, 1935 |
| 2,387,905 | Hoeh | Oct. 30, 1945 |